S. L. BAILEY.
POWER TRANSMISSION CLUTCH.
APPLICATION FILED MAR. 4, 1919.

1,371,542.

Patented Mar. 15, 1921.

Inventor:
Stephen Leslie Bailey

UNITED STATES PATENT OFFICE.

STEPHEN LESLIE BAILEY, OF KINGSWOOD, BRISTOL, ENGLAND.

POWER-TRANSMISSION CLUTCH.

1,371,542.

Specification of Letters Patent.   Patented Mar. 15, 1921.

Application filed March 4, 1919. Serial No. 280,672.

*To all whom it may concern:*

Be it known that I, STEPHEN LESLIE BAILEY, a subject of the King of England, residing at Kingswood, Bristol, in the county of Gloucester, England, have invented certain new and useful Improvements in Power-Transmission Clutches, of which the following is a specification.

This invention is for improvements in or relating to power transmission clutches and has particular reference to the type of friction-clutch in which a coil spring, mounted co-axially with the rotational axis of the clutch, bears upon the long arms of radially disposed multiplying-levers to thrust, by the agency of their short arms, the driving and driven members of the clutch into frictional engagement with one another, means operable at will being provided to relieve the latter of this thrust to thereby free the clutch. In such clutch-mechanism it is necessary to employ two or more multiplying-levers spaced around one of the engageable members so that the pressure applied by the clutch-spring shall be distributed over the engaged surfaces. The multiplying-levers are usually mounted on the face of a disk with their pivotal axes lying in a plane at right-angles to the axis of rotation of the clutch, and it is obviously of the utmost importance that the levers should be initially perfectly adjusted and fitted, otherwise the pressure applied through them to the clutch-members is not evenly applied, and as a consequence, when in engagement, jamming or slipping of the said members is liable to take place. Furthermore, even if initially well adjusted, as a result of usage the bearing surfaces of the respective levers may wear unequally one with another, and so cause the aforesaid defects thereby rendering the action of the clutch uncertain.

It is one of the principal objects of the present invention to so mount the levers that the plane in which their pivotal axes lie shall be self-adjusting relative to the planes in which their arms bear so as to insure that the pressure of the clutch spring is evenly distributed notwithstanding any wear which may take place in the said levers or clutch parts.

According to the present invention, in a clutch-mechanism of the type described there is combined with it a co-axially disposed member which carries the multiplying-levers pivotally mounted upon it and is provided with a universal joint or the like whereby it is tiltable about cross-axes. By this means when two or three levers are employed the plane in which their pivotal axes lie can tilt itself so that the pressure applied to them by the clutch-spring is evenly distributed around the clutch, notwithstanding initial inaccuracies of fitting or the result of subsequent wear.

Preferably the lever-carrying member is thrust, by the pressure of the clutch-spring upon its levers, against an abutment (for example, a radial flange) upon the clutch-shaft or an extension thereof, the face of which abutment is of spheroidal form to engage a spherioidal recess in the opposed face of the lever-carrying member (or vice versa). This provides simple means by which the axis of the lever-carrying member can tilt with reference to the clutch axis.

The clutch spring may be contained within a hollow clutch-shaft and bear at one end upon a shoulder therein, and at the other end upon a plunger operatively connected to the aforesaid levers, and to means (for example, a bell-crank lever pivoted to a stationary member external to the clutch), operable at will to move the plunger and compress the clutch-spring, to thereby relieve the levers of its pressure.

Other important features of this invention will be hereunder described and pointed out in the claims.

In the accompanying drawings:—

Figure 1:
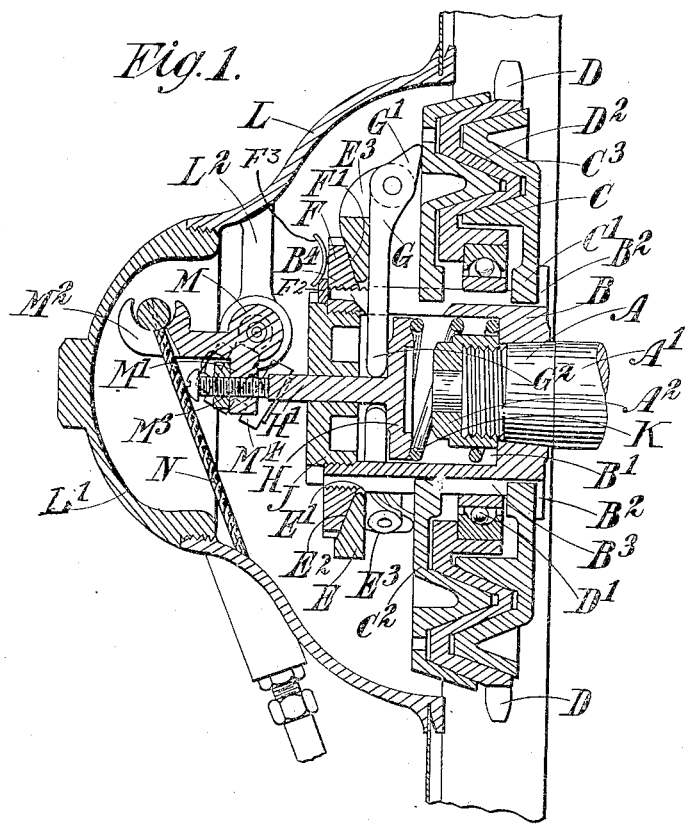
Figure 1 is a longitudinal central section of the clutch and its surrounding casing.

Mounted upon the tapered end A of the engine shaft $A^1$ is a tubular extension B secured by a nut $A^2$ which bears upon a shoulder $B^1$ formed within the hollow extension B.

A radial outwardly-directed flange $B^2$ is formed on the inner end of the extension B, against which bears a clutch member C in the form of a disk. Longitudinal slots $B^3$ are formed in the outer surface of the extension B and the disk C is pierced by a central hole having projections $C^1$ which engage the slots so that relative rotation of the disk C upon the extension B is prevented.

Mounted upon the extension B by means of a ball bearing $D^1$ to be rotationally free thereon is a chain-wheel D, which lies against the disk C. A second disk $C^2$ pierced similarly to the disk C to engage the slots B³ on the extension B lies against the outside face of the chain-wheel D. The disks C, C² thus constitute the driving elements of the clutch-mechanism and are adapted to engage the driven member D by frictional contact with its sides. To increase the frictional surfaces and the effective action thereof, circumferential corrugations D² of V-section may be formed in known manner in the chain-wheel D to be engaged by corresponding corrugations C³ in the surface of the disks C, C². A disk E, pierced by a central hole E¹ of a size to allow free movement of the disk E in a radial direction on the extension B, is at its outer face provided with a spheroidal recess E² whose center of origin is on the axis of the disk E. A collar F with a spheroidal end surface F¹, to enter the corresponding recess in the disk E, is screw-threaded upon the extension B and is provided with a pawl F² to engage means hereinafter described to lock the collar F upon the extension in any desired position. A spring finger F³, secured to collar F, serves to hold the pawl in inoperative position when desired.

Carried upon the disk E are lugs E³ to which are pivoted three radially-disposed multiplying-levers G whose short arms G¹ bear upon the disk C² and whose long arms G² extend into the interior of the extension B by way of apertures B⁴ formed to receive them at the bottom of the slots B³.

Within the interior of the extension B is a plunger H having a stem H¹ which extends through and is guided by an axial hole in a cap J which closes the interior of the extension B and has threaded connections with its walls. The cap J is locked fast to the extension B and is provided with grooves J¹ in its periphery so that the spring-pressed pawl F² above mentioned can engage with them to prevent accidental unscrewing of the collar F.

Between the plunger H and the shoulder B¹ in the interior of the extension B is situated a compression spring K which acts upon the plunger H to thrust it against the long arms G² of the levers G to cause their short arms G¹ to bear on the outer face of the disk C², thus causing the disk E which carries the levers G to be pressed against the spheroidal surface F¹ of the collar F.

A casing L (preferably oil-tight) incloses the clutch mechanism and is provided with an inspection door L¹. Pivoted to a bracket L² carried upon the casing L is a bell-crank lever M so disposed that one arm M¹ can actuate the plunger-stem H¹. The other arm M² of the bell-crank lever is connected by means of a cable N, which is carried through the wall of the casing L, with the clutch-operating plunger H. An adjusting screw M³ is provided in the arm M¹ of the bell-crank lever to bear on the end of the plunger-stem H¹.

The action of the clutch will be apparent from the foregoing description of its constituent parts, whereby it will be seen that the thrust of the clutch spring K upon the plunger H is communicated to the levers G so that the driven member D of the clutch is compressed between the driving members C, C² and thereby is frictionally engaged by them. Furthermore, the disk E is caused to bear upon the spheroidal surface of the collar F and can slide thereon to adjust the position of the lever pivots so that the pressure of the clutch spring K is evenly distributed by the levers G upon the disk C². The aggregate pressure on the clutch members may be varied according to requirements by the adjustment of the collar F endwise upon the extension B. This adjustment may be made quickly and entirely without the use of tools by compressing the spring K through the medium of the control-lever, which relieves all pressure on the spheroidal faces and allows the collar F to be screwed or unscrewed after first raising the spring-pressed pawl F².

The engagement of the long arms G² of the levers G with the sides of the apertures B⁴ in the extension B prevents the disk E rotating relatively to the extension B or the other members carried thereon.

To free the clutch the cable N is operated to cause the bell-crank lever M to turn on its pivotal axis and by its arm M¹ to thrust upon the plunger H to compress the clutch-spring and relieve the levers G of its thrust. In this manner the pressure of the members C C² upon the driven member D is also relieved and the latter can then rotate freely on its ball bearings D¹ carried by the extension B. Adjustment of the releasing gear is provided by the adjustable screw M³ of the bell-crank lever M, and if desired in the cable N also by any usual means.

It will be seen that a clutch-mechanism according to this invention provides a compact and simple construction, and one which insures even pressure of the clutch spring upon the engaged members. Furthermore, owing to the disposition of the levers a comparatively light spring may be employed so that a minimum effort is required to release it. All the constituent parts are covered by a casing, but notwithstanding can be readily inspected, adjusted or dismantled.

The use of the clutch is not restricted to the engine shaft but may equally well be employed on a countershaft if desired. Furthermore, the clutch can be applied to any machine or mechanism in which its use is desirable.

It will be apparent that if desired the extension piece which carries the clutch members may be formed integrally with the shaft and also that the driving member remote from the levels may be formed integrally with the part which carries it.

Figure 2:
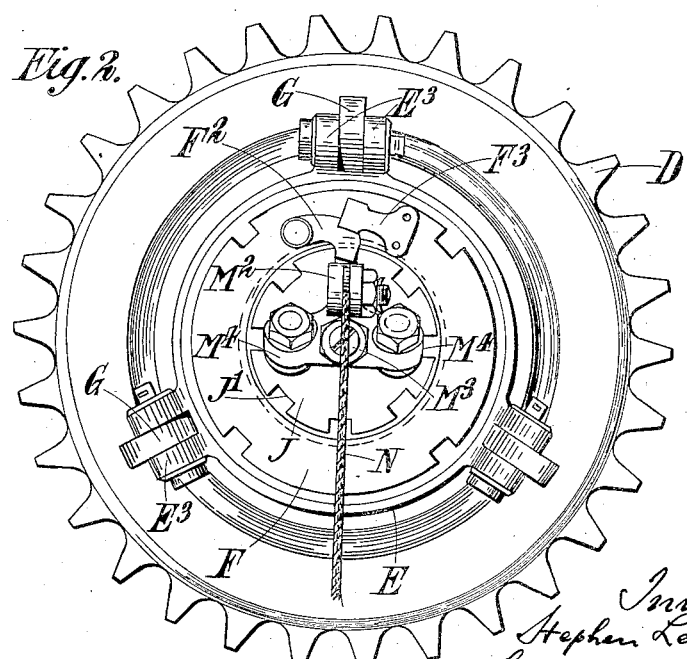
Fig. 2 is an end view thereof with its casing removed.

When the clutch is carried upon a shaft other than that of a prime mover, it is usually desirable to provide means for checking its "spin" when declutched, as for instance to facilitate gear-changing. For this purpose there is incorporated with the clutch-releasing means a clutch-brake, illustrated in Figs. 1 and 2, as applied to the bell-crank lever M. The arm M¹ of the latter is provided with a lateral extension on each side to carry adjustable brake pads M⁴, so disposed that after release of the clutch, continued movement of the bell-crank lever M causes them to bear upon the end of the cap J to frictionally retard the movement of the clutch shaft.

What I claim as my invention and desire to secure by Letters Patent is:—

1. In a clutch mechanism, the combination with a shaft having a tubular extension, of coöperating clutch members respectively fast and loose on said extension, a collar fast on the extension and having a spherical face, a correspondingly shaped disk seated on said face, clutch-operating levers pivoted on said disk with their shorter arms bearing against the back of one of said clutch members, a plunger within said extension, the longer arms of said levers bearing against one side of said plunger, a spring within said extension and bearing against the other side of said plunger, a stem on said plunger, and manual means to adjust said stem longitudinally to vary the force of said spring.

2. In a clutch mechanism, the combination with a shaft having a tubular extension thereon, and coöperating clutch members fast and loose on said extension respectively, of a collar adjustably mounted on said extension and having a spherical face, a correspondingly shaped disk seated on said face, clutch-operating levers pivoted on said disk with their shorter arms bearing against the back of one of said clutch members, a plunger slidable within said extension, the longer arms of said levers bearing against one side of said plunger, a spring within said extension and bearing against the other side of said plunger, a stem on said plunger passing through said collar, a bell-crank lever one arm of which engages the end of said stem, a tension member secured to the other arm of said bell-crank lever, and means to actuate said tension member to swing said bell-crank lever on its pivot and thereby vary the effective force of said spring.

In testimony whereof I have signed my name to this specification in the presence of two subscribing witnesses.

STEPHEN LESLIE BAILEY.

Witnesses:
ALFRED H. HARRISON,
G. C. DUNN.